(12) United States Patent
Mishra et al.

(10) Patent No.: US 7,689,652 B2
(45) Date of Patent: Mar. 30, 2010

(54) USING IP ADDRESS AND DOMAIN FOR EMAIL SPAM FILTERING

(75) Inventors: Manav Mishra, Kirkland, WA (US);
Elissa E. S. Murphy, Seattle, WA (US);
Geoffrey J Hulten, Lynwood, WA (US);
Joshua T. Goodman, Redmond, WA (US); Wen-Tau Yih, Champaign, IL (US)

(73) Assignee: Microsoft Corporation, Redmond, WA (US)

( * ) Notice: Subject to any disclaimer, the term of this patent is extended or adjusted under 35 U.S.C. 154(b) by 1026 days.

(21) Appl. No.: 11/031,672

(22) Filed: Jan. 7, 2005

(65) Prior Publication Data

US 2006/0168041 A1    Jul. 27, 2006

(51) Int. Cl.
*G06F 15/16* (2006.01)
*G06F 15/173* (2006.01)
(52) U.S. Cl. .................. 709/206; 709/225; 709/227
(58) Field of Classification Search ......... 709/204–207, 709/217–227
See application file for complete search history.

(56) References Cited

U.S. PATENT DOCUMENTS

| 5,999,932 | A | * | 12/1999 | Paul | ................. | 707/10 |
|---|---|---|---|---|---|---|
| 6,023,723 | A | * | 2/2000 | McCormick et al. | ......... | 709/206 |
| 7,206,814 | B2 | * | 4/2007 | Kirsch | ......... | 709/206 |
| 2005/0080855 | A1 | * | 4/2005 | Murray | ......... | 709/206 |
| 2005/0080856 | A1 | * | 4/2005 | Kirsch | ......... | 709/206 |
| 2005/0091319 | A1 | * | 4/2005 | Kirsch | ......... | 709/206 |
| 2006/0036693 | A1 | * | 2/2006 | Hulten et al. | ......... | 709/206 |
| 2006/0129644 | A1 | * | 6/2006 | Owen et al. | ......... | 709/206 |
| 2008/0104235 | A1 | * | 5/2008 | Oliver et al. | ......... | 709/224 |
| 2008/0147857 | A1 | * | 6/2008 | Oliver et al. | ......... | 709/224 |

* cited by examiner

*Primary Examiner*—Saleh Najjar
*Assistant Examiner*—Farzana Huq
(74) *Attorney, Agent, or Firm*—Lee & Hayes, PLLC (57) ABSTRACT

Email spam filtering is performed based on a combination of IP address and domain. When an email message is received, an IP address and a domain associated with the email message are determined. A cross product of the IP address (or portions of the IP address) and the domain (or portions of the domain) is calculated. If the email message is known to be either spam or non-spam, then a spam score based on the known spam status is stored in association with each (IP address, domain) pair element of the cross product. If the spam status of the email message is not known, then the (IP address, domain) pair elements of the cross product are used to lookup previously determined spam scores. A combination of the previously determined spam scores is used to determine whether or not to treat the received email message as spam.

17 Claims, 7 Drawing Sheets

ABSTRACT# USING IP ADDRESS AND DOMAIN FOR EMAIL SPAM FILTERING

RELATED APPLICATION

This application is related to U.S. patent application Ser. No. 10/809,163, entitled "Training Filters for IP Address and URL Learning" filed Mar. 25, 2004, to Joshua Goodman, et al., the entirety of which is incorporated by reference herein, which is a continuation-in-part of U.S. patent application Ser. No. 10/454,168, entitled "Origination/Destination Features and Lists for Spam Prevention", filed Jun. 4, 2003, the entirety of which is incorporated by reference herein.

TECHNICAL FIELD

This invention relates to electronic mail systems, and more specifically to using IP address and domain for email spam filtering.

BACKGROUND

With more and more individuals connected to the Internet and having electronic mail (email) accounts, it has become feasible for advertisers and other groups or individuals to disseminate advertisements and promotions to a large audience. Many such advertisements and promotions are sent as unwanted email messages (spam) to large numbers of email users.

A common technique used by spammers is to spoof a domain name in an attempt to make an email message appear to be coming from one domain, when, in fact, it is being sent from a different domain. Because spammers frequently spoof domain names, email filters that are trained based on previously received email messages, may mistakenly determine that a particular domain is frequently associated with spam. For example, a particular domain (e.g., microsoft.com) may be associated with a company (e.g., Microsoft, Inc.) that does not send spam, but because the domain may be frequently spoofed by spammers, an email spam filter may be inaccurately trained to assume email from the microsoft.com domain is spam.

One attribute of an email message that is difficult to conceal or alter is an IP address from which the email was sent. While it is fairly easy for spammers to spoof a domain name, it is very difficult to spoof an IP address. Furthermore, email that is legitimately sent from a particular domain (e.g., microsoft.com) is typically sent from a computer having an IP address that is associated with the owner of the domain (e.g., Microsoft, Inc.). For example, Microsoft may be assigned a group of IP addresses each of which is associated with a computer belonging to Microsoft. When an email message is sent from one of those computers, the IP address of the sender matches one of the IP addresses that is assigned to Microsoft, Inc., and the domain is also owned by Microsoft, Inc. However, if a spammer sends an email message with a spoofed microsoft.com domain, the sender IP address associated with the email message will not be an IP address that is assigned to Microsoft.

Accordingly, a need exists for an email spam filtering technique that utilizes both an IP address and a domain associated with a received email message.

SUMMARY

Using IP address and domain for email spam filtering is described herein.

In an implementation of using IP address and domain for email spam filtering, an email message is received that is known to be either spam or non-spam. An IP address and a sending domain are determined for the email message. The identified IP address and domain are combined and associated with a spam score that is based, at least in part, on the known spam status of the received email message.

When an email message with unknown spam status is received, an IP address and a sending domain are determined for the email message. A combination of the identified IP address and domain is used to look up a previously determined spam score. This score may be used by itself as a spam score, but is more typically combined with other scores to determine an overall spam score. The overall spam score is then used to determine whether or not to treat the received email message as spam.

In an implementation of using IP address and domain for email spam filtering, two processes are used: a training process to generate the spam scores, and a filtering process to use the spam scores. In the training process, an email message is received that is assumed to be either spam or non-spam. An IP address and a sending domain are determined for the email message. The IP address and the domain are processed, resulting in a set of IP address portions based on the IP address and a set of domain portions based on the domain. A cross product of the two sets is then generated, resulting in a set of (IP address portion, domain portion) pairs. For each element of the cross product, a spam score is then determined based, at least in part, on the assumed spam status of the received email message.

When an email message with unknown spam status is received, an IP address and a sending domain are determined for the email message. The IP address and the domain are processed, resulting in a set of IP address portions based on the IP address and a set of domain portions based on the domain. A cross product of the two sets is then generated, resulting in a set of (IP address portion, domain portion) pairs. For each element of the cross product, a data repository lookup is performed to identify a previously determined spam score in association with the cross product element. The score is used by itself or in combination with other components to determine an overall spam score. The overall spam score is used to determine whether or not to treat the received email message as spam.

BRIEF DESCRIPTION OF THE DRAWINGS

The same numbers are used throughout the drawings to reference like features and components.

DETAILED DESCRIPTION

The following discussion is directed to an electronic mail filter that determines whether or not a particular email message is unwanted (spam) based on an IP address and a domain associated with a sender of the email message.

An email spam filter is trained based on received email messages that are known to be either good or spam. For example, one or more users of an email system may choose to submit data that indicates whether particular email messages they have received are good or spam. An IP address from which the email message was sent and a domain that the message claims to have been sent from are combined and assigned a value that indicates, for example, how much known spam email has been received from the IP address/domain combination compared to how much known good email has been received from the IP address/domain combination. Such data is compiled over time to generate a large data set that can be used as a reference for filtering incoming email messages.

Figure 1:
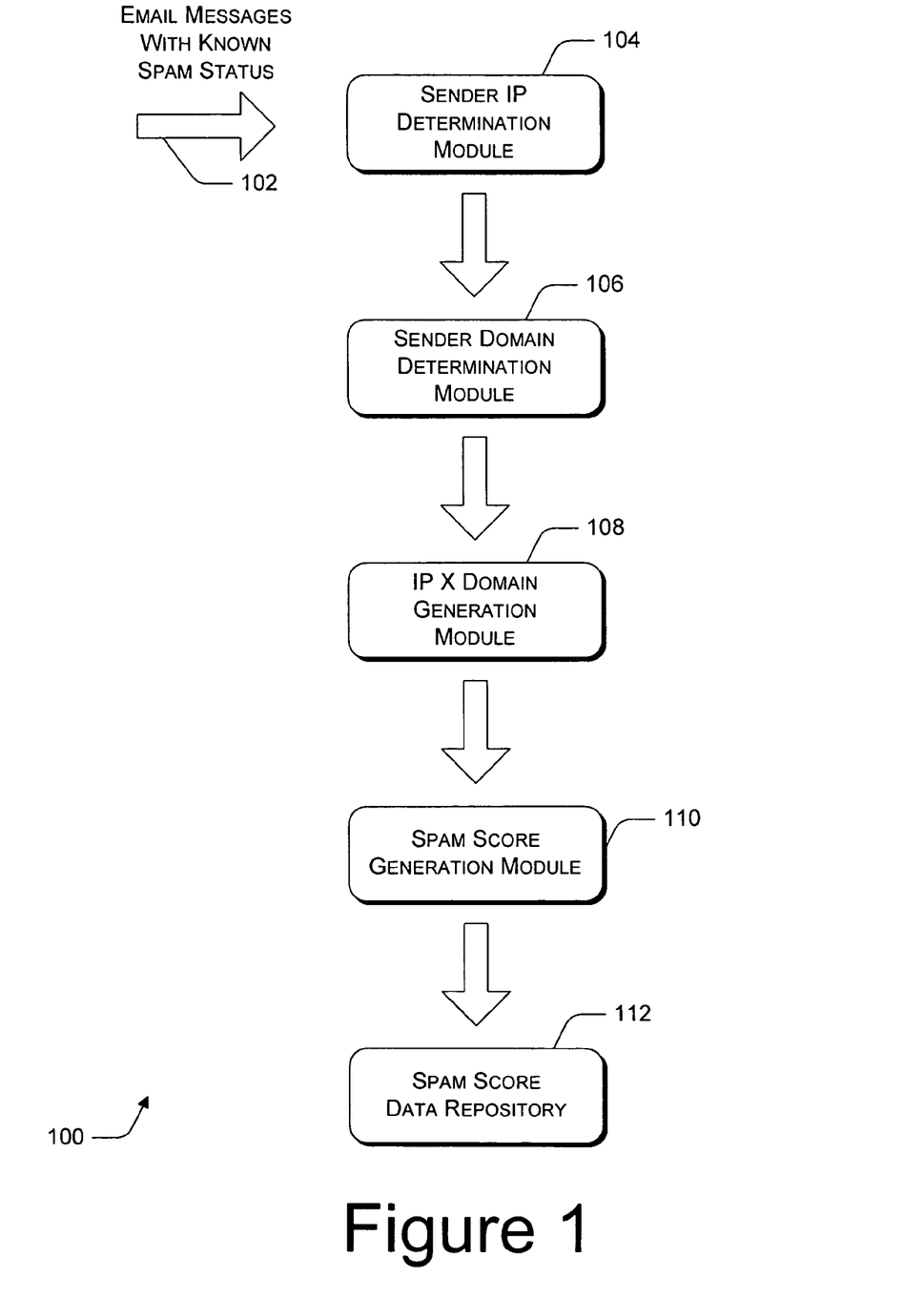
FIG. 1 is a block diagram illustrating an exemplary data flow for training an implementation of an email spam filter based on a combination of IP address and domain.

FIG. 1 illustrates a data flow 100 for training an exemplary implementation of an email spam filter.

In an exemplary implementation, the training process utilizes a set of email messages that are assumed to be spam and a set of email messages that includes good mail. The spam mail can come, for example, from user feedback, such as queries to users about specific messages (commonly referred to as the feedback loop), user complaints, honeypot/trap account data, or where a spam filter indicates that the mail is spam. The good mail can come from user feedback (e.g., the feedback loop), reports of mistakes (e.g., a user indicates that a message flagged as junk mail is really good mail), or presumed good mail (e.g., mail to a user where the sender is on the user's safe list, or where a spam filter indicates that the mail is good). In an alternate approach, a sample of all mail may be used as presumed good mail. While such a sample may contain substantial spam, over time, the training system will learn to distinguish good mail from spam mail.

In an exemplary implementation, email messages with known spam status are gathered over time and processed as a batch to train an email filter. In an alternate implementation, training may be performed each time a message with a known spam status is received.

For each received email message with known spam status 102, sender IP determination module 104 determines an IP address from which the message was sent. For example, sender identification module 104 may extract data from a header associated with the email message to determine an IP address from which the email message was sent.

Exemplary techniques for determining an IP address from which an email message was sent are described in further detail in U.S. patent application Ser. No. 10/809,163, the entirety of which is incorporated by reference herein.

Sender domain determination module 106 determines a domain from which the email message appears to have been sent. For example, data may be extracted from a header associated with the email message to determine a sending domain. Because sending domains are frequently spoofed by spammers, it is recognized that the determined domain may or may not be the actual domain from which the email message was sent. The determined domain is the domain from which the sender of the email message wants the recipient to think the email message originated.

For each received email message 102, IP X domain generation module 108 generates a cross product of the IP address determined by sender IP determination module 104 and the domain determined by sender domain determination module 106. In an exemplary implementation, IP X domain generation module 108 converts the IP address into a set of IP address portions and converts the domain into a set of domain portions. For example, if the IP address is 1.2.3.4, the generated IP portions may include 1.*, 1.2.*, 1.2.3.*, and 1.2.3.4, where the "*" is a wildcard representing any number of characters. Similarly, if the domain is boo.foo.bar.baz, the generated set of domain portions may include boo.foo.bar.baz, *.foo.bar.baz, and *.bar.baz. Accordingly, the generated cross product (IP X domain) may include the following elements:

(1.*, boo.foo.bar.baz)
(1.*, *.foo.bar.baz)
(1.*, *.bar.baz)
(1.2.*, boo.foo.bar.baz)
(1.2.*, *.foo.bar.baz)
(1.2.*, *.bar.baz)
(1.2.3.*, boo.foo.bar.baz)
(1.2.3.*, *.foo.bar.baz)
(1.2.3.*, *.bar.baz)
(1.2.3.4, boo.foo.bar.baz)
(1.2.3.4, *.foo.bar.baz)
(1.2.3.4, *.bar.baz)

Spam score generation module 110 receives as input, the IP X domain cross products and the known spam statuses of the received email messages. In an exemplary implementation, spam score generation module 110 also receives the domains determined by sender domain determination module 106 and/or the IP addresses determined by sender IP determination module 104. Spam score generation module 110 assigns an appropriate spam score to one or more of the received features (i.e., IP address, domain, and/or IP X domain cross product element) based on the known spam statuses of the received email messages. For example, for each received email message, a positive number may be assigned to features associated with email messages known to be spam and a negative number may be assigned to features associated with email messages is known to be good. The same spam score may be assigned to each feature of a particular email message, or alternatively, different spam scores may be assigned to each feature. For example, if the email message is known to be spam, a first spam score may be assigned to one or more of the features (e.g., the cross product elements that include the full domain specified in association with the email message), and a second spam score may be assigned to one or more of the remaining features. In this way, for example, a stronger indication of spam may be associated with cross product elements that include the full specified domain, while a lesser indication of spam may be associated with the elements that include shorter portions of the specified domain. The values are typically assigned using a machine learning algorithm that attempts to optimize the assignment of scores taking into account all messages and their features simultaneously. The spam scores for features are often assigned so that the combined score for a given training message represents, for example, a likelihood that an email message is spam given that it is associated with the particular feature. It is recognized that any number of techniques may be used to assign spam scores to one or more email message features, including elements of the IP X domain cross product. Furthermore, it is recognized that spam scores may be represented in any number of ways, not limited to numeric values.

Although illustrated as a single module in FIG. 1, spam score generation module 110 may be representative of multiple modules. For example, separate modules may be used to generate spam scores for the IP address and/or the domain. Furthermore, other features of received email message may also be assigned spam scores that can be used in combination with spam scores associated with elements of an IP X domain cross product to filter email messages as good or spam.

The scores assigned to email message features (e.g., domain, IP address, and IP X domain elements) may depend on each other, and on scores associated with other features. For example, a score of +10 might be assigned to "microsoft.com", indicating a high likelihood that an email message received from "microsoft.com" is spam. A score of −20 might be assigned to "1.2.3.* x microsoft.com", indicating a high likelihood that an email message received from "microsoft.com" and an IP address that fits the "1.2.3.*" format is good. The combined effect is that email messages received from the domain "microsoft.com" are usually treated as spam but those received from the domain "microsoft.com" whose IP fits the format "1.2.3.*" would be treated as good.

In an exemplary implementation, the determined domain is used in combination with the IP X domain elements to train the email filter and to determine whether a received email message is spam. The combination of the domain and the IP X domain elements can be especially valuable compared to using just the IP X domain elements. For example, the system may determine that the domain "microsoft.com" is generally bad (e.g., because spammers often spoof it), but that mail from (1.2.3.*, microsoft.com), which really comes from Microsoft, can always be assumed good. The scores for the domain "microsoft.com" and the IP X domain element (1.2.3.*, microsoft.com) could be combined in such a way that spoofed mail from microsoft.com is typically rejected, while mail actually from microsoft.com is typically accepted.

Similarly, in another implementation, the IP address from which the email message was sent may be used in combination with the IP X domain elements in training an email filter and in filtering incoming email. In general, spoofing email addresses (or domains) is used mostly by spammers, but there are several legitimate reasons to spoof as well. In particular, mailing list systems and mail forwarders often have legitimate reasons to spoof. If the IP address 1.2.6.7 corresponds to a mail forwarder or mailing list system, we might learn that mail from 1.2.3.* x microsoft.com is good, while mail from microsoft.com is bad, and mail from 1.2.6.7 is good. The scores would be learned in such a way that most spoofers would be caught as spammers, while legitimate mail from Microsoft, and legitimate (but spoofed) mail from 1.2.6.7 (the forwarder) is allowed as good. In such a system, the IP X domain elements and the IP address are used as inputs to a machine learning system. While machine learning systems (such as support vector machines, Naïve Bayes, the Perceptron, and logistic regression) typically assign scores to each component, many other implementations are possible, such as multi-layer neural networks and decision trees. These other implementations may use the information, but may not explicitly assign scores to individual components.

In the described exemplary implementation, the spam scores for features of the received email messages are generated by spam score generation module 110 and stored in spam score data repository 112. In an exemplary implementation, the spam scores are generated as a batch process, and any data previously stored in spam score data repository 112 is replaced with the newly generated data. In an alternate implementation in which email messages with known spam status are processed one-by-one, for each feature that is not already represented in spam score data repository 112, a new entry is written that represents the feature (e.g., domain, IP address, or IP X domain cross product element) and the associated spam score. For each feature that is already represented in spam score data repository 112, the spam score generated by spam score generation module 110 is combined with the spam score already maintained in spam score data repository 112 in association with the particular feature.

Spam score generation module 110 typically employs one or more machine learning algorithms to generate the spam scores for each email message feature (e.g., IP address, domain, and/or cross product element). For example, email messages may be received that can be represented by the following data:

| IP Address | Domain | Spam Status |
|---|---|---|
| 1.2.3.4 | Microsoft.com | Good |
| 1.2.3.5 | Microsoft.com | Good |
| 100.2.3.4 | Microsoft.com | Spam |
| 101.2.3.4 | Microsoft.com | Spam |
| 7.2.10.9 | Example.com | Good |
| 7.2.11.9 | Example.com | Good |
| 7.2.12.9 | Example.com | Good |
| 7.2.13.9 | Example.com | Spam |
| 8.9.10.11 | ExExample.com | Good |
| 100.101.102.103 | ExExample.com | Good |

The IPxDomain elements and other features (e.g., domain and/or IP address), are then trained, typically using a machine learning algorithm. In an exemplary implementation that generates spam scores for IP X domain elements and domains, the following data may be generated by the training:

| Feature | Spam Score |
|---|---|
| ExExample.com | −10 |
| Microsoft.com | +10 |
| 7.2.* x Example.com | −3 |
| 1.2.3.* x Microsoft.com | −20 |

In this example, the scores are assigned such that the training examples are classified correctly, with a total score above 0 for spam messages, and a total score below 0 for good messages, with the exception of the message from 7.2.13.9. In some cases, some sources may appear to send both good and spam messages. In an exemplary implementation, the score assigned to elements associated with such sources will indicate the majority case, but will be closer to 0 than for a source that appears to always send spam or always send good messages. In an exemplary implementation, the score represents a degree of confidence, or can be mapped to a probability that a given message is spam or good. Examples of machine learning algorithms that may be used include, but are not limited to, a support vector machine, a logistic regression model, a maximum entropy model, a decision tree, a neural network, or a naïve Bayesian model.

Figure 2:
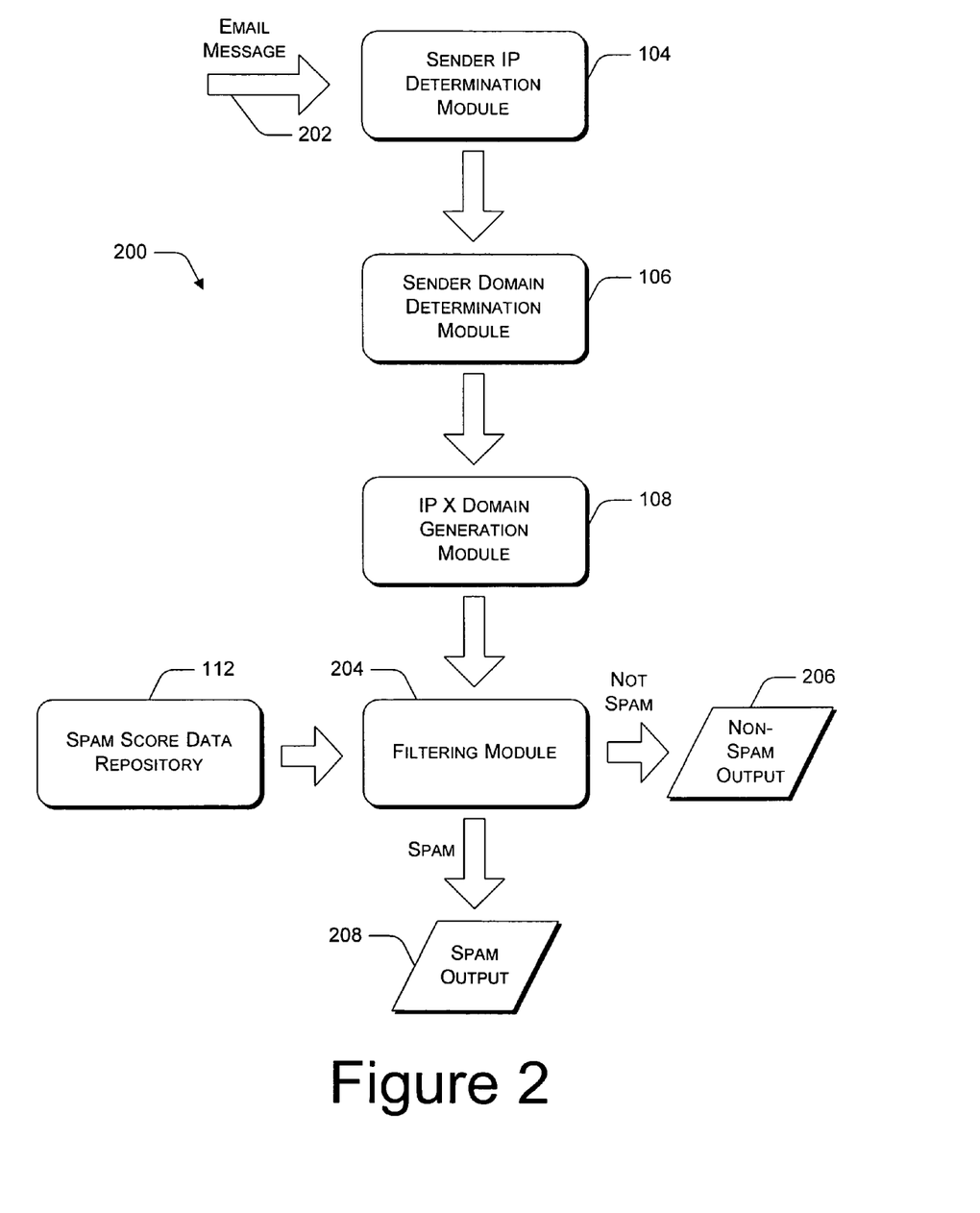
FIG. 2 is a block diagram illustrating an exemplary data flow through an implementation of an email spam filter that utilizes a combination of IP address and domain.

FIG. 2 illustrates a data flow 200 for filtering email according to an exemplary implementation of an email spam filter based on a sender IP address and a sender domain.

When email message 202 is received, sender IP determination module 104 determines an IP address from which the message was sent. For example, as described above with reference to FIG. 1, sender identification module 104 may extract data from a header associated with the email message to determine an IP address from which the email message was sent.

Sender domain determination module 106 determines a domain from which the email message appears to have been sent. For example, as described above, data may be extracted from a header associated with the email message to determine a sending domain.

IP X domain generation module 108 generates a cross product of the IP address determined by sender IP determination module 104 and the domain determined by sender domain determination module 106. In an exemplary implementation, as described above with reference to FIG. 1, IP X domain generation module 108 converts the IP address into a set of IP address portions and converts the domain into a set of domain portions, and then determines a cross product (IP X domain) for the received email message.

Filtering module 204 compares the cross product elements generated by IP X domain generation module 108 with data stored in known IP X domain data repository 112 to calculate a spam score for the received email message 202. As described above, in an exemplary implementation, spam score data repository may include spam scores for other email message features as well, including, but not limited to, domain and IP address, independent of one another. In such an implementation, any combination of features associated with the received email message for which spam scores are found in spam score data repository 112 may be used to calculate a spam score for the received message, and thus determine whether or not the received email message should be treated as spam.

Any number of techniques may be used to calculate a spam score based on an IP address and a domain associated with a received email message. In an exemplary implementation, for each element of the cross product that is generated by IP X domain generation module 108, a lookup is performed against spam score data repository 112. Depending on how much known data has been gathered for email messages from the same or similar IP addresses and domains, any number of the generated cross product elements may have an associated spam score in spam score data repository. In the described exemplary implementation, the spam scores for the cross product elements that are found in spam score data repository are summed to determine an overall spam score for the incoming email address. In an exemplary implementation, spam scores associated with other features of the email message (e.g., domain and/or IP address) may also be included in the sum. For example, if the cross product includes twelve elements, but only five of them are found in the spam score data repository, then the spam scores in the data repository that are associated with those five elements are added to determine the spam score for the received email message.

Summing the spam scores found in the data repository represents only one specific implementation. It is recognized that any number of techniques may be used to generate an overall spam score for a particular received email message, based on previously gathered data that represents spam scores associated with IP address/domain combinations. For example, alternate implementations may rely on an average or weighted average rather than a sum.

After filtering module 204 determines an overall spam score for the received email message, the overall spam score is evaluated to determine whether or not the received email message is to be treated as spam. For example, filtering module 204 may compare the determined overall spam score to a spam score threshold. If the overall spam score is under the spam score threshold, then filtering module 204 generates non-spam output 206, indicating that the received email message 202 is to be treated as a good (non-spam) message. If the spam score is over the spam score threshold, then filtering module 204 generates spam output 208, indicating that the received email message 202 is to be treated as spam.

Figure 3:
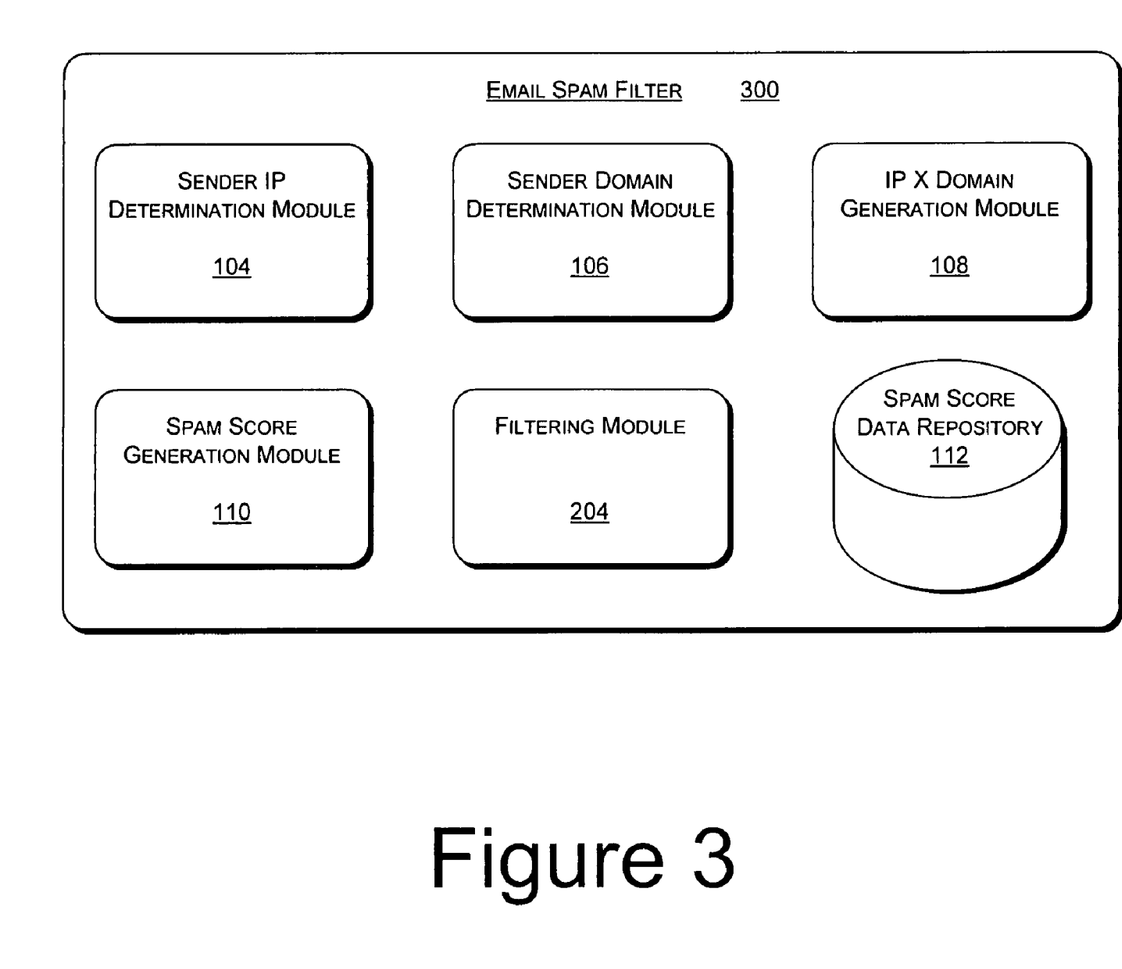
FIG. 3 is a block diagram of selected components of an exemplary email spam filter.

FIG. 3 illustrates select components of an email spam filter 300. Exemplary email spam filter 300 includes sender IP determination module 104, sender domain determination module 106, IP X domain generation module 108, spam score generation module 110, spam score data repository 112, and filtering module 204.

Sender IP determination module 104 is configured to determine an IP address from which a received email message was sent. For example, sender IP determination module 104 may examine header data associated with a received email message to identify an IP address from which the email message was sent. Alternatively, sender IP determination module 104 may determine a range of IP addresses that includes the IP address from which the email message was sent.

Sender domain determination module 106 is configured to determine a sending domain associated with the received email message. The determined domain may or may not be a domain from which the email message was actually sent (e.g., the domain may be spoofed), but rather, the determined domain is the domain from which the email message appears to have been sent. In an exemplary implementation, the sending domain may be extracted, for example, from header data associated with the received email message.

IP X domain generation module 108 is configured to determine a cross product of the IP address determined by sender IP determination module 104 and the domain determined by sender domain determination module 106. In the described exemplary implementation, IP X domain generation module 108 performs a roll-up operation on the determined IP address to generate multiple IP address portions, and performs a roll-up operation on the determined domain to generate one or more domain address portions. A cross product of the determined IP address portions and the domain address portions is then determined, resulting in a set of (IP address portion, domain portion) pairs.

Spam score generation module 110 is configured to determine a spam score for one or more of the (IP address portion, domain portion) pairs generated by IP X domain generation module 108 in association with a received email message that is known to be either spam or good (non-spam). Spam score generation module 110 may also be configured to determine a spam score for the IP address identified by sender IP determination module 104 and/or the domain identified by sender domain determination module 106. Spam scores for each of the email features (e.g., each (IP address portion, domain portion) pair, the IP address, and the domain) may be determined independently or based on one another, depending on the type of machine learning algorithm that is employed.

Typically, for example, for an (IP address portion, domain portion) pair that has not been previously evaluated, a spam score of 0 would be returned. However, it is possible that another strategy could be used, such as determining an optimal score for previously unseen pairs at various levels of rollup.

Spam score data repository 112 is typically updated in a batch mode. After a certain period of time, or when a certain number of additional messages have arrived, the scores may be updated using a batch machine learning algorithm such as a maximum entropy algorithm or a support vector machine algorithm. Alternatively, the scores may be updated in an online mode, using, e.g., a perceptron algorithm, which modifies scores whenever a mistake is made in prediction. As yet another alternative, an algorithm may be used that uses sufficient statistics, such as the Naïve Bayes algorithm. Such an algorithm stores not just the scores for each (IP address portion, domain portion) pair, but also so-called sufficient statistics that allow the rapid and incremental calculation of new scores. For instance, the Naïve Bayes algorithm might store, for each pair, the number of known good messages seen and the number of known spam messages seen. These are the sufficient statistics. The algorithm could then compute a spam score such as:

log(# known good/(# known good+# known bad))

Filtering module 204 is configured to filter incoming email messages based on data stored in spam score data repository 112. For example, when a new email message is received, a cross product of an IP address associated with the email message and a domain associated with the email address is determined. The elements of the cross product (typically along with the domain and/or the IP address) are then used to perform one or more lookups in spam score data repository 112 to determine an overall spam score associated with the incoming email message. Depending on the value of the determined overall spam score, the incoming email message is then treated as a good (non-spam) message or as a spam message.

Figure 4:
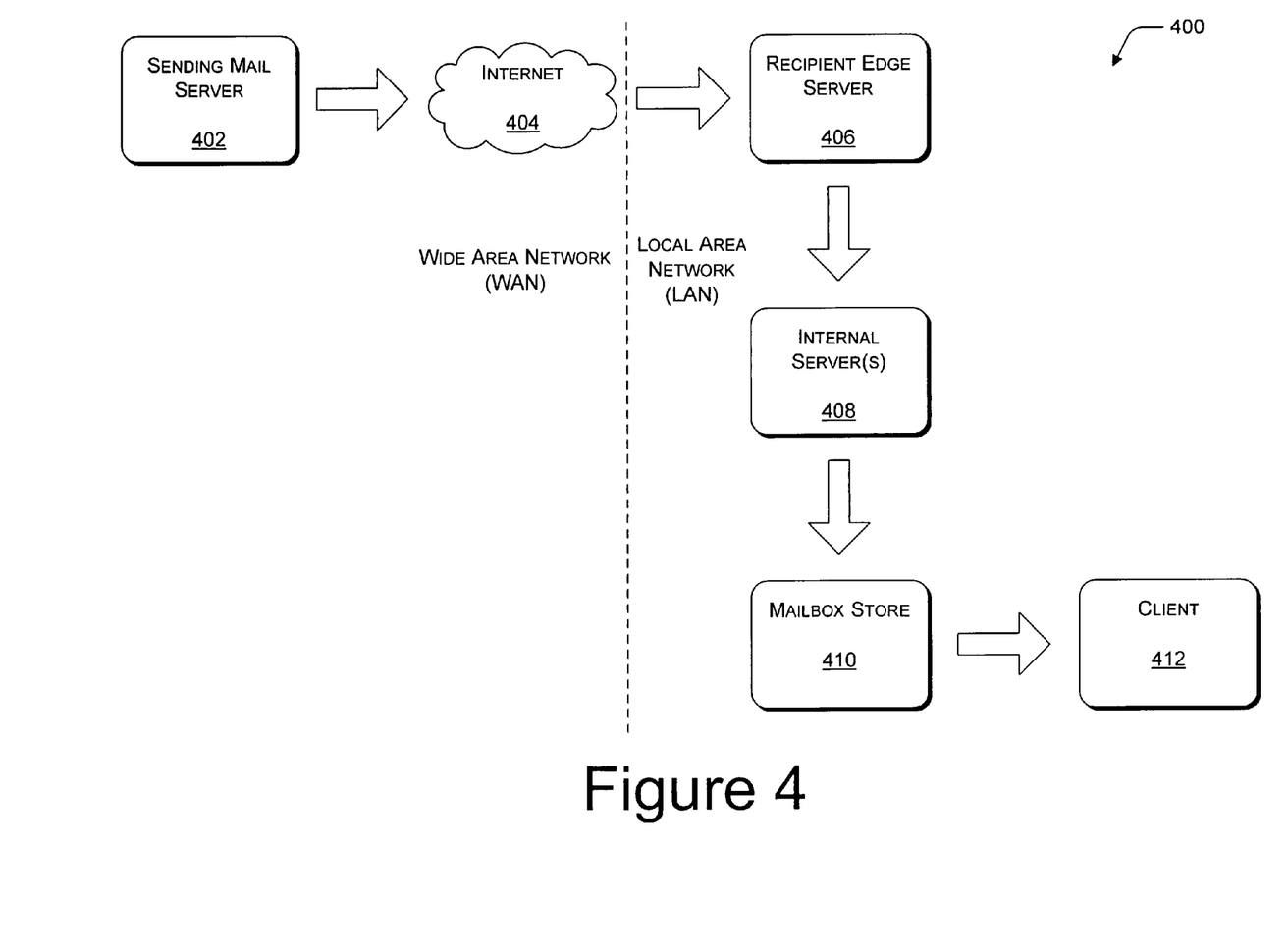
FIG. 4 is a block diagram of an exemplary network environment in which an email spam filter may be implemented.

FIG. 4 illustrates an exemplary network environment 400 in which an IP address and a domain may be used to perform email spam filtering. An email message is generated and communicated via sending mail server 402 across a wide area network (WAN) such as the Internet 404. The email message is received by a server associated with a local area network (LAN), such as recipient edge server 406.

Recipient edger server 406 represents a LAN server that is configured to receive email messages directly from the Internet 404. When recipient edge server 406 receives an email message, the email message is forwarded to an internal server 408 that is associated with the LAN. The email message may pass through multiple internal servers 408 before being forwarded to mailbox store 410, which can be accessed by a client 412 running an email client application.

Email spam filter 300 may be implemented as a component of recipient edge server 406, as a component of any of internal servers 408, as a component of mailbox store 410, or as a component of client 412. Alternatively, components of email spam filter 300 may be distributed across multiple LAN servers or systems. For example, sender IP determination module 104 may be implemented as a component of recipient edge server 406 while the remaining components of email spam filter 300 may be implemented as components of internal server 408. Furthermore, an exemplary implementation of network environment 400 may include any number of (including zero) internal servers 408. Alternatively, in an exemplary implementation of network environment 400, mailbox store 410 may be implemented as a component of one or more internal servers 408, or there may be no internal servers 408 and mailbox store 410 may be implemented as a component of recipient edge server 406.

Figure 5:
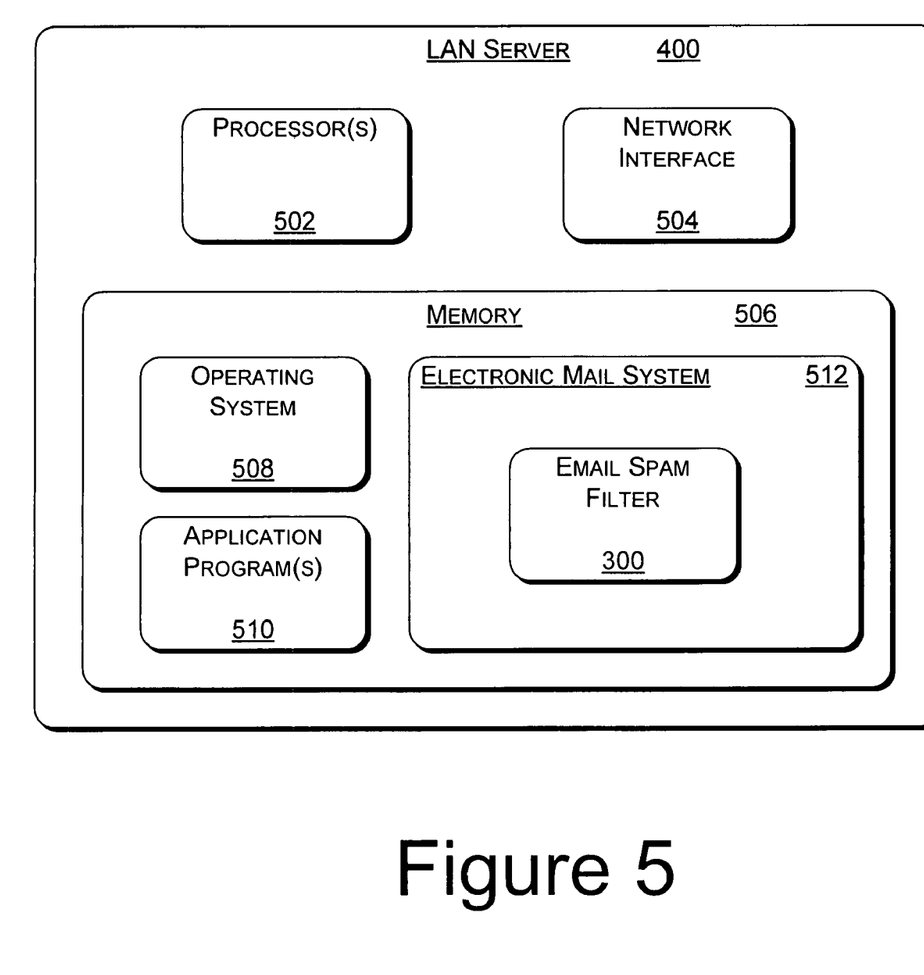
FIG. 5 is a block diagram of selected components of an exemplary local area network server implemented to include an email spam filter.

FIG. 5 illustrates select components of an exemplary local area network (LAN) server 400 that is implemented to include an email spam filter 300 as described above with reference to FIG. 3. LAN server 400 includes one or more processors 502, a network interface 504, and memory 506. Network interface 504 enables LAN server 400 to communicate with other computer systems via the local area network, and/or via a wide area network such as the Internet.

An operating system 508 and one or more application programs 510 are stored in memory 506 and executed on processor 502. An electronic mail system 512 is also stored in memory 506 and includes email spam filter 300. Electronic mail system 512 may be configured to perform any number of email related tasks, including, but not limited to, receiving email, filtering email, virus scanning email, and delivering email. Exemplary components of email spam filter 300 are described above with reference to FIG. 3.

LAN server 400 may be representative of recipient edge server 406, and/or one or more internal servers 408, as described above with reference to FIG. 4. Also, as described above, components of email filter 300 may be distributed across multiple servers, such as recipient edge server 406 and internal servers 408.

Methods for using an IP address and a domain for email spam filtering, such as exemplary method 600 described with reference to FIG. 6 and exemplary method 700 described with reference to FIG. 7, may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 6:
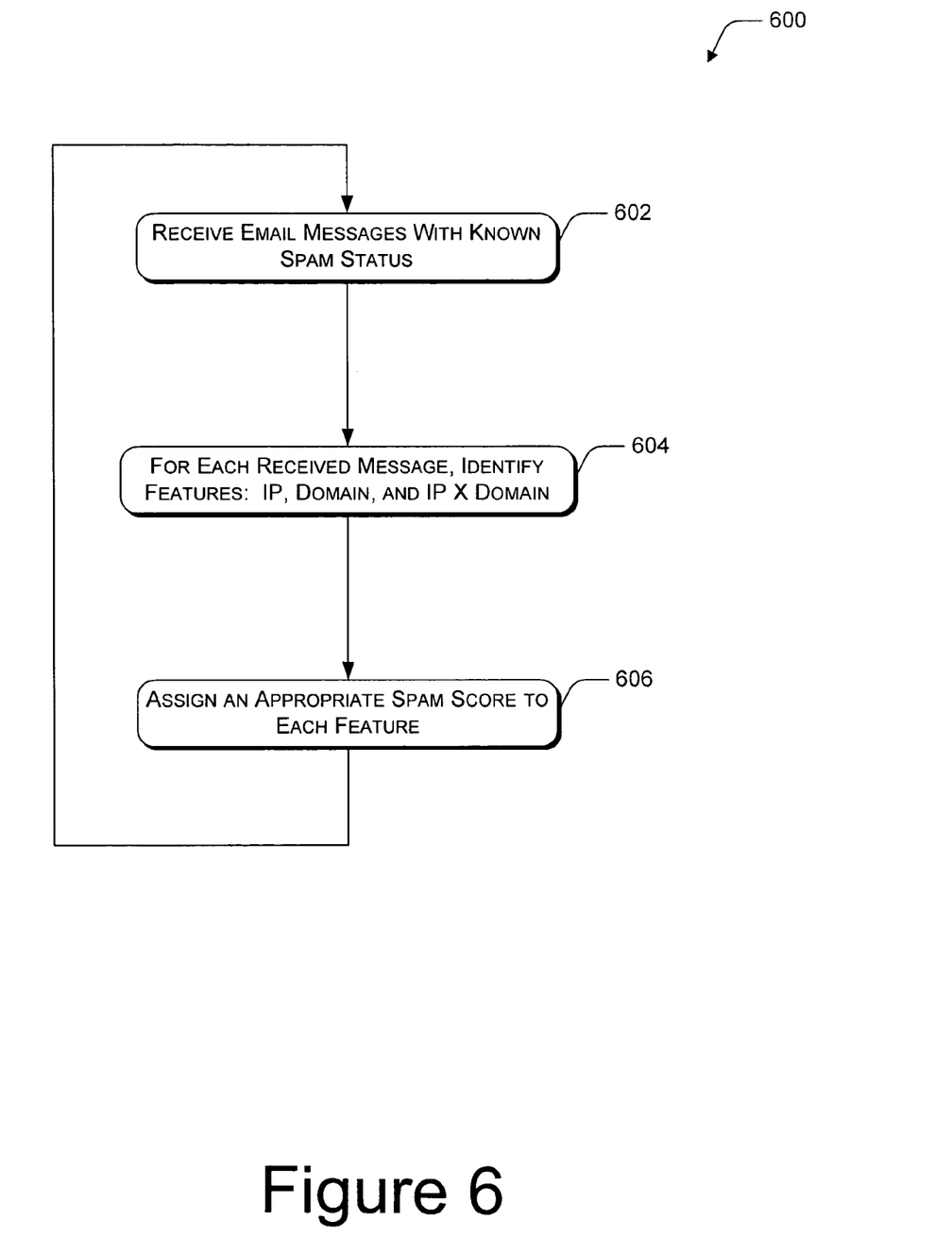
FIG. 6 is a flow diagram of an exemplary method for training an electronic mail filter to identify spam based on IP address and domain.

FIG. 6 illustrates an exemplary method 600 for training an email spam filter based on a combination of sender IP address and sending domain. The order in which the method is described is not intended to be construed as a limitation, and any number of the described method blocks can be combined in any order to implement the method. Furthermore, the method can be implemented in any suitable hardware, software, firmware, or combination thereof.

At block 602, the spam filter receives email messages that have a known spam status (i.e., each email message is known to be either spam or good (non-spam)). For example, a user may choose to forward to the spam filter an email message they have received, including an indicator of whether the user considers the email message to be good or spam. In the illustrated exemplary implementation, email messages with known spam status are processed in a batch mode. In alternate implementations, email messages with known spam status may be processed individually.

At block 604, the spam filter determines, for each received email message with known spam status, an IP address from which the email message was sent, a domain from which the email message appears to have been sent, and a cross product of the determined IP address and the determined domain. For example, referring to FIG. 3, sender IP determination module 104 may extract data from the email message header to determine an IP address from which the email message was sent, sender domain determination module 106 may extract data from the email message header to determine a domain from which the email message appears to have been sent, and IP X domain generation module 108 may generate the cross product. As described above, exemplary techniques for determining an IP address from which an email message was sent are described in further detail in U.S. patent application Ser. No. 10/809,163, the entirety of which is incorporated by reference herein.

When a user composed and sends an email message, a standard set of header fields is typically added to the contents of the email message. For example, a user (e.g., Bob Smith) with email address UserA@companyX.com may compose a message to a user (e.g., Linda Jones) with email address UserB@bcompanyY.com. When the message is transmitted from Bob's client to Company X's mail server, the header may look something like:

From: usera@companyx.com (Bob Smith)
   To: userb@companyy.com (Linda Jones)
   Date: Fri, Dec. 10, 2004 12:23:45 PST
   Subject: Lunch Tomorrow?

When Company X's mail server prepares to send the message to Company Y's mail server, a "Received:" line is added to the header, which then may look like:

Received: from alpha.companyx.com (alpha.companyx.com [1.2.3.4] by mail.companyx.com (5.6.7) id 006A31; Fri, Dec. 10, 2004 12:23:48-0800 (PST)
   From: usera@companyx.com (Bob Smith)
   To: userb@companyy.com (Linda Jones)
   Date: Fri, Dec. 10, 2004 12:23:45 PST
   Message-Id: <rth031897143614-00000298@mail.companya.com>
   Subject: Lunch Tomorrow?

As the email message is sent from one machine to another, for example via the Simple Mail Transfer Protocol (SMTP), a series of commands are exchanged between the sending and receiving machines. For example, an exchange between mail.companyx.com and mail.companyy.com may be similar to the following (the commands issued by mail.companyx.com are in bold):

220 mail.companyy.com ESMTP Sendmail 8.8.5/1.4/8.7.2/1.13; Fri, Dec. 10, 2004 12:23:52-0800 (PST)
   HELO mail.companyx.com
   250 mail.companyy.com Hello mail.companyx.com [1.2.3.4], pleased to meet you
   MAIL FROM: usera@companyx.com
   250 usera@companyx.com . . . Sender ok
   RCTP TO: userb@companyy.com
   250 userb@companyy.com . . . Recipient ok
   DATA
   354 Enter mail, end with "." on a line by itself
   Received: from alpha.companyx.com (alpha.companyx.com [1.2.3.4] by mail.companyx.com (5.6.7) id 006A31; Fri, Dec. 10, 2004 12:23:48-0800 (PST)
   From: usera@companyx.com (Bob Smith)
   To: userb@companyy.com (Linda Jones)
   Date: Fri, Dec. 10, 2004 12:23:45 PST
   Message-Id:<rth031897143614 00000298@mail.companya.com>
   Subject: Lunch Tomorrow?
   Hi Linda—
   Do you want to have lunch tomorrow?—Bob
   .
   250 LAA20869 Message accepted for delivery
   QUIT
   221 mail.companyy.com closing connection When Company Y's mail server receives the message and processes it, making it available to Linda, another "Received:" line is added to the header, which then looks like:

Received: from mail.companyx.com (mail.companyx.com [1.2.3.4]) by mail.companyy.com (5.6.7/8.7.2) with ESMTP id LAA20869 for userb@companyy.com; Fri, 10 Dec. 2004 12:24:55-0800 (PST)
   Received: from alpha.companyx.com (alpha.companyx.com [1.2.3.4] by mail.companyx.com (5.6.7) id 006A31; Fri, Dec. 10, 2004 12:23:48-0800 (PST)
   From: usera@companyx.com (Bob Smith)
   To: userb@companyy.com (Linda Jones)
   Date: Fri, Dec. 10, 2004 12:23:45 PST
   Message-Id: <rth031897143614-00000298@mail.companya.com>
   Subject: Lunch Tomorrow?

As illustrated by the above example, a sending domain may be determined at block 604 by extracting data from the "From:" header line (also known as the "message from), from one or more of the "Received:" header lines, from the "HELO" command line, and/or from the "MAIL FROM:" command line (also known as the "envelope from"). Any number of techniques may be used to determine a sending domain (real or spoofed) associated with a received email message. Extraction of data from one or more of the header fields or SMTP commands as illustrated above is just one example of how such data may be determined.

In an exemplary implementation, when determining the IP X domain for a received email message, IP X domain generation module 108 performs a roll-up on the determined IP address and the determined domain, and then generates a cross-product using the roll-up results. This process is also described in further detail above with reference to FIG. 3.

For example, assuming the determined IP address associated with a received email address is 1.2.3.4, a roll-up operation may be performed resulting in a set of IP address portions {1.2.3.4, 1.2.3.*, 1.2.*, 1.*}. Similarly, if the determined domain associated with the received email address is foo.bar.baz.boo, a roll-up operation may be performed resulting in a set of domain portions {foo.bar.baz.boo, *.bar.baz.boo, *.baz.boo}.

A cross product of the two sets is then generated, resulting in the following elements:

(1.2.3.4, foo.bar.baz.boo)
   (1.2.3.4, *.bar.baz.boo)
   (1.2.3.4, *.baz.boo)
   (1.2.3.*, foo.bar.baz.boo)
   (1.2.3.*, *.bar.baz.boo)
   (1.2.3.*, *.baz.boo)
   (1.2.*, foo.bar.baz.boo)
   (1.2.*, *.bar.baz.boo)
   (1.2.*, *.baz.boo)
   (1.*, foo.bar.baz.boo)
   (1.*, *.bar.baz.boo)
   (1.*, *.baz.boo)

At block 606, the spam filter assigns an appropriate spam score to one or more of the email message features generated as described above with reference to block 604. For example, if the email message is known to be spam, then a spam score of +10 may be associated with the IP address and/or the domain, and each element of the cross product. Similarly, if the email message is known to be good, a spam score of −10 may be associated with the IP address and/or the domain, and each element of the cross product.

In an exemplary implementation, spam scores for features of email messages with known spam status are maintained in spam score data repository 112. Any types of machine learning algorithms may be utilized to determine spam scores for the identified email message features. Furthermore, spam scores for particular email message features may be determined independently of spam scores for other features, or a spam score for one feature may be based, at least in part on a spam score determined for another feature.

In an exemplary implementation, method 600 for training an email spam filter based on a combination of sender IP address and sending domain is performed as a batch process and is repeated, for example, after a specific period of time or after a particular number of email messages with known spam status are received. In an alternate implementation, the process may be performed each time a message with known spam status is received, rather than as a batch process.

Figure 7:
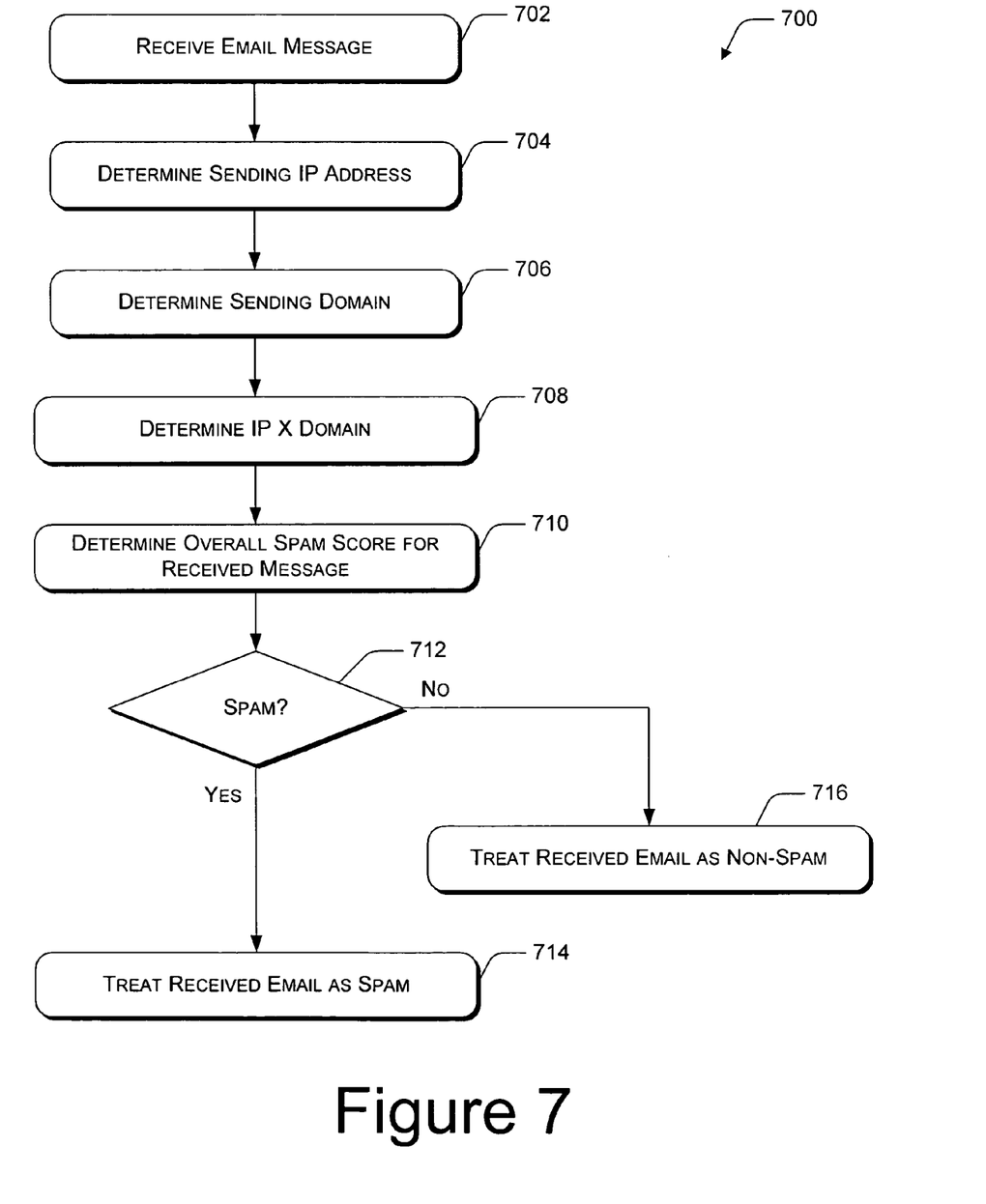
FIG. 7 is a flow diagram of an exemplary method for filtering electronic mail to identify spam based on IP address and domain.

FIG. 7 illustrates an exemplary method 700 for filtering email messages based on a combination of sender IP address and sending domain. The order in which the method is described is not intended to be construed as a limitation, and any number of the described method blocks can be combined in any order to implement the method. Furthermore, the method can be implemented in any suitable hardware, software, firmware, or combination thereof.

At block 702, the spam filter receives an incoming email message.

At block 704, the spam filter determines an IP address from which the email message was sent. For example, as described above with reference to block 604 of FIG. 6, and referring to FIG. 3, sender IP determination module 104 may extract data from the email message header to determine an IP address from which the email message was sent.

At block 706, the spam filter determines a domain from which the email message appears to have been sent. For example, referring to FIG. 3, sender domain determination module 106 may extract data from the email message header or from SMTP commands to determine a domain from which the email message appears to have been sent. Header data and SMTP commands from which sender domain information may be extracted is described in further detail above with reference to block 604 of FIG. 6.

At block 708, the spam filter determines IP X domain for the received email message. For example, referring to FIG. 3, IP X domain generation module 108 performs a roll-up on the determined IP address and the determined domain, and then generates a cross-product using the roll-up results. Generation of an example cross product is described in further detail above with reference to block 604 of FIG. 6.

At block 710, the email filter determines an overall spam score for the received email message based, at least in part, on the IP X domain cross product. In an exemplary implementation, a combination of the IP X domain cross product and the domain is used to determine the overall spam score. In an alternate implementation, a combination of the IP X domain cross product and the IP address is used to determine the overall spam score. In yet another alternate implementation, a combination of the IP X domain cross product, the domain, and the IP address is used to determine the overall spam score.

For example, referring to FIG. 3, filtering module 204 may perform a lookup in spam score data repository 112 using each element of the cross product that was generated as described above with reference to block 708. Filtering module 204 may also perform a look up in spam score data repository 112 using the domain and/or the IP address. The result of each lookup is a spam score associated with a particular feature of the received email message. The number of spam scores that will be returned as a result of the lookups depends on the amount of known email data that has been previously gathered in association with the IP address and domain that are associated with the current received email address. Alternatively, a lookup using a feature value that is not found in spam score data repository may return a default value (e.g., 0). All, some, or none of the lookups performed may return spam scores. In an exemplary implementation, the returned spam scores are summed to generate a spam score for the received email message. Other techniques may also be used to generate a spam score, for example, determining a weighted average, with each spam score weighted based, for example, on how many known email messages have been reviewed to generate the spam score or based on how closely the particular lookup element matches the determined IP address and domain for the received email message.

At block 712, the email filter uses the calculated overall spam score to determine whether the received email message is spam or good. For example, the overall spam score may be compared to a spam score threshold. If the overall spam score is over the threshold the email is considered spam, but if the overall spam score is under the threshold the email is considered good.

If the overall spam score indicates that the received email message is spam (the "Yes" branch from block 712), then at block 714, the email filter treats the received email message as spam. On the other hand, if the overall spam score indicates that the received email message is not spam (the "No" branch from block 712), then at block 716, the email filter treats the received email message as non-spam.

In an alternate implementation, multiple threshold ranges may be used to determine how the received email message is to be processed. For example, if the spam score indicates that the received email message has a high likelihood of being spam, the email message may be deleted without being delivered to the intended recipient; if the spam score indicates that the email message has a moderate likelihood of being spam, the email message may be automatically delivered to the recipients junk mail folder.

Although embodiments of email spam filtering have been described in language specific to structural features and/or methods, it is to be understood that the subject of the appended claims is not necessarily limited to the specific features or methods described. Rather, the specific features and methods are disclosed as exemplary implementations of email spam filtering.

The invention claimed is:

1. A method, comprising:
receiving an email message that is assumed to be non-spam;
determining an IP address associated with a sender of the email message;
generating an IP address set comprising a combination of portions of the IP address;
determining a domain from which the email message appears to have been sent;
generating a domain address set comprising a combination of portions of the domain name;
generating an IP/domain set by computing a cross-product of the IP address set and the domain set, the IP/domain set comprising elements of the cross-product;
determining an IP/domain spam score that represents a likelihood that an email message received from the IP address and the domain is spam;
associating the IP/domain spam score with the IP/domain set based at least in part on the elements of the cross-product;
storing the IP/domain spam score in association with the IP/domain set in a spam score data repository;
identifying, in the spam score data repository, a previously generated spam score associated with the domain;
determining a message spam score that is based on the email message assumed to be non-spam;
combining the message spam score with the previously generated spam score to generate the IP/domain spam score; and
determining whether to treat the email message as spam based on the message spam score.

2. The method as recited in claim 1, wherein the email message is received via user feedback.

3. The method as recited in claim 1, wherein determining the IP/domain spam score comprises utilizing a machine learning algorithm.

4. The method as recited in claim 1, wherein the combining comprises calculating a sum of the previously generated spam score and the message spam score.

5. The method as recited in claim 1, further comprising:
for each element of the IP/domain set:
determining an element spam score; and
associating the element spam score with the element of the IP/domain set.

6. An electronic mail server system comprising at least one processor performing the method as recited in claim 1.

7. An electronic mail client application comprising at least one processor performing the method as recited in claim 1.

8. A method implemented by at least one processor, the method comprising:
receiving an email message;
determining an IP address associated with a sender of the email message;
determining a domain from which the email message appears to have been sent;
generating an IP address set comprising combination of multiple portions of the IP address;
generating a domain address set comprising combination of one or more portions of the domain name;
generating, by the at least one processor, an IP/domain set by computing a cross-product of the IP address set and the domain set, each element of the IP/domain set representing a unique pair of a portion of the IP address and portion of the domain name;
for each element of the IP/domain set, identifying a previously determined element spam score that represents a likelihood that an email message received from an IP address and domain that matches the element is spam;
determining a message spam score by combining the previously determined element spam scores; and
determining whether to treat the email message as spam based on the message spam score.

9. The method as recited in claim 8, wherein determining the message spam score comprises combining the previously determined element spam scores with a previously determined spam score associated with the IP address associated with the sender of the email message.

10. The method as recited in claim 8, wherein determining the message spam score comprises combining the previously determined element spam scores with a previously determined spam score associated with the domain from which the email message appears to have been sent.

11. The method as recited in claim 8, wherein combining the previously determined element spam scores comprises calculating a sum of the previously determined element spam scores.

12. The method as recited in claim 8, wherein determining whether to treat the email message as spam comprises:
comparing the message spam score to a spam score threshold; and
in an event that the message spam score is greater than the spam score threshold, processing the email message by performing at least one of: deleting the email message, delivering the email message as junk mail, or flagging the email message as spam.

13. An electronic mail server system comprising at least one processor performing the method as recited in claim 8.

14. An electronic mail client application comprising at least one processor performing the method as recited in claim 8.

15. A system, comprising:
a processor;
a memory;
a sender IP determination module stored in the memory and executed by the processor, the sender IP determination module configured to determine an IP address from which a received email message was sent;
a sender domain determination module configured to determine a domain from which the received email message appears to have been sent;
an IP X domain generation module configured to:
expand the IP address into a set of partial IP addresses;
expand the domain into a set of domain portions; and
generate a cross product, (IP X Domain), of the set of partial IP addresses and the set of domain portions;
a machine learning algorithm configured to calculate a spam score to be associated with an element of (IP X Domain); and
a data repository configured to maintain an association between the element of (IP X Domain) and the spam score.

16. The system as recited in claim 15, further comprising:
a filtering module configured to classify a received email message as good or spam based, at least in part, on the previously determined spam score.

17. The system as recited in claim 15, embodied as an electronic mail spam filter.

* * * * *